May 4, 1937.　　　C. WILHJELM　　　2,079,497
CONTROLLING SYSTEM FOR REGULATORS
Filed Feb. 15, 1934　　　2 Sheets-Sheet 1

Fig.1

INVENTOR.
Christian Wilhjelm
BY Frank H. Borden
ATTORNEY.

May 4, 1937.  C. WILHJELM  2,079,497

CONTROLLING SYSTEM FOR REGULATORS

Filed Feb. 15, 1934   2 Sheets-Sheet 2

INVENTOR
Christian Wilhjelm
BY
Frank H. Borden
ATTORNEY

Patented May 4, 1937

2,079,497

UNITED STATES PATENT OFFICE 2,079,497

CONTROLLING SYSTEM FOR REGULATORS

Christian Wilhjelm, Philadelphia, Pa., assignor to Automatic Temperature Control Co. Inc., Philadelphia, Pa., a corporation of Pennsylvania Application February 15, 1934, Serial No. 711,365

23 Claims. (Cl. 236—15)

This invention relates to controlling systems for regulators.

This invention pertains particularly to regulators for the control of valves, dampers, rheostats, etc. which it is desired to adjust one way or the other in order to maintain certain desired constant temperature, pressure or humidity conditions. It will be evident from the discussion that follows that this invention has a wide scope in its possible application in many varied fields, but fields of such diversity that it will be difficult, if not practically impossible, here to mention all such possible uses. The three uses mentioned above, however, are and may be taken to be representative and typical examples.

Heretofore, it has been common practice to use two different principles selectively and alternatively, usually, when it was desired to obtain automatic control through a gradual movement of the controlling member. Using the first principle, the actuating instrument responds to the changes in the conditions to be controlled and then through suitable intermediate means the valve, damper, or other controlled device, is shifted in the direction that will tend to correct the change that occurred in the condition to be controlled. For purposes of discussion a valve will be considered the controlled member or element. The movement of the valve may be through the medium of electricity, air or other forces, but in all cases, the principle is to move the valve and to continue to move the valve at certain predetermined speeds, (or rather to so show on the actuating instrument).

This principle in its most improved forms gives almost perfect control when there is almost instantaneous response on the actuating instrument to the changes it effects through the adjustment of the valve. In practice, however, there always exists some delay and as this delay (generally called the time lag) increases, this type of controller becomes proportionally more and more incapable of securing or imparting satisfactory control.

The reason for this is, simply, that the time lag, literally speaking, keeps on fooling the controller, and calls for changes too late, and then, therefore, for a time equal to the time lag, there are valve correcting actions taken that should not be made. For this reason the controllers of this type cannot be depended upon, where there is a large or a very variable time lag to contend with in the operated system. Various improvements have been designed in connection with this system by means of which it is made possible to overcorrect by fast shifting of the valve for some time while the change shows up on the control gauge, and thereafter the correction is stopped or perhaps the correction is even counteracted during the last part of the cycle, in an effort to prevent or minimize the effect of overcorrection.

Even with such improvements, which incidentally complicate the equipment greatly, it is difficult to get good control with these systems when the time lag is from 1 to 5 minutes, and it becomes almost impossible to get any surety of control if the time lag is over 5 minutes.

The main advantage with these control systems is the complete freedom of the valve to shift from one extreme to the other and to remain there, in response to changes in the actuating instrument. Thus it is possible, as an example, with such system to continue to maintain a temperature condition constant or almost constant at 1000° F. with the valve in the gas burner line either approximately ¼ or ¾ open, or somewhere between, as the condition in the furnace may require. However, this very freedom of the valve in its movements is what limits the system when long or variable time lag is present as it will cause overadjustment and undue fluctuations, termed "hunting". Hunting frequently occurs in apparently inexplicable spells.

The hunting spells will start suddenly, for no apparent reason, and may disappear again, and even the expert observer at the operation cannot account for either the start or the finish. However, at times such hunting spells become chronic and will not stop and the controlling member continues to operate from one extreme position to the other in more or less regular cycles without corresponding great changes otherwise in the fuel demand. The peculiar part is that such chronic hunting spells generally happen when there is no particular need for controlling action. If the control system was disconnected during such a chronic hunting spell it would generally be found that the system would settle down and operate almost steadily without any need for controlling action. Therefore, the only cure for chronic hunting spells is manually to stop the controller action until the pulsations set up thereby have calmed down. Then the controller can again be connected and may function perfectly for some time until it gets another spell.

The real cause of these hunting spells lies in the fact that these control systems cannot modify the controlling action to accord with changing time lag conditions, which arise upon unpredictable occasions and at sporadic intervals. To illustrate this point a theoretical example may be given and discussed. Assume a temperature control proposition, a furnace heated with gas and having a normal time lag of one minute, from the time a valve change takes place and until this change shows up or is indicated on or by the responsive element.

The furnace operates continuously with more or less varying load, and when the load increases the automatic control sets in to open the valve to increase the fuel supply. Let it be assumed that at the same time there happens to be a lowering of the gas pressure in the fuel line so that the opening of the valve does not, and, of course, cannot have the calculated effect in raising the temperature to the desired point in the period of the normal time lag of one minute. Consequently, despite the valve change, the temperature continues to drop or to stay low, and the valve is then further opened by the control until it eventually gets the valve opened to a point where enough gas is passed to the furnace to raise the temperature, regardless of the low gas pressure. At this time assume the load condition to be reversed and the gas pressure suddenly to come back to normal. These factors are effective in sending the temperature well over the control point before the control device can take care of the two changes which have mutually cooperated in raising the temperature. The controller should be fast enough in its movements to prevent the temperature from going too high, but in its earnest effort to do so it causes itself to accelerate the temperature fluctuations to such an extent that the changes caused by the controller are greater than the changes occurring normally in the furnace. From this point on the controller will expend its movement and effort alternately to open or close the valve in attempts to correct for its own overcorrections. It will not steady down again unless a load change or a fuel pressure change, or their equivalents, happen at the precise moment, in combination or separately, and of sufficient potential value, as completely to neutralize one of the temperature swings caused by the controller action. If such a furnace condition change does not occur, or is not of sufficient size when it does occur, or does not happen at exactly the right time, the hunting will continue.

The better systems are not so susceptible to hunting spells as the more simple and crude systems, but they all have that possibility, because they do not actually have means capable in each case of determining the amount of fuel required to compensate for the instant change occurring, and neither have they means for determining and responding to such variations in time lag as necessarily occur in a furnace where several variables act, separately, in combination, or in opposition to change the time lag.

It will be obvious that if the fuel valve is moved to open the valve because the temperature is low, and a further increase in load takes place, the apparent and effective time lag is greater than if no further load change takes place. Conversely, the time lag apparently and effectively decreases if a load decrease takes place simultaneously with a rising gas pressure, or its equivalent, an increase in B. t. u. content, for example.

The other system of the two alternative systems under discussion, is founded upon the principle of regulating the valve in direct proportion to the amount of deviation of the condition responsive device. The simplest illustrative control system founded on this principle is disclosed in the now common automatic shutter on the radiator of an automobile. In this device an element in the radiator expands and contracts with the temperature of the cooling water, and this expansion and contraction respectively opens and closes the radiator shutter. This last mentioned principle of control system is justified by the fact that the regulating movement is proportionate to the temperature deviation and the temperature deviation is a true indication of the fuel requirement. It is evident that if a certain gas furnace had a normal load and therefore a corresponding fuel requirement of say 100 cubic feet of gas per hour, to hold a temperature of 1400° F., and the load is increased without any change in the gas supply, then the temperature of the furnace will drop say 200° F. to 1200° F. As the load again decreases the temperature will be raised and if the load ever gets back to the original value the temperature will again establish itself at 1400° F. By this experiment and a few checks on the fuel used at the various load conditions it is possible to calibrate a temperature indicating or recording instrument in fuel requirements, so that, for example, when the temperature is 1400° F. this point would be marked 100 cubic feet per hour, if the temperature indicates 1200° F., this point for example, would be marked 200 cubic feet per hour, because a test has shown that it requires that much gas flow to maintain 1400° F. when the load of the furnace was of a value capable of causing the 200° F. drop.

Now the main difficulty encountered in practice when utilizing this, what might be termed "load condition gauge" to proportion the fuel supply, is that it is an absolute necessity that the changing load condition get a chance to register its full effect, before a definite indication of the amount of fuel change required can be had. This requirement immediately almost destroys the possibility of making use of the system, as above explained. It is evident at a glance that if the furnace must maintain say + or −10° around 1400° F., then it is impossible to have the furnace react to the full temperature effect from a given load change, that might, if left alone, eventually cause a 50° change before making a correction. In practice heretofore this has been overcome by so proportioning the regulating movement to the temperature movement that the extreme fuel change (as in the example above of 100 cubic feet) is made when the furnace temperature drops 10° below 1400° F., or as a makeshift, if the extreme load change does not happen very often, a compromise adjustment may be made whereby a temperature drop of 10° or 20° is permitted before the valve is opened to its 200 cubic feet value. It is evident that, after all, the temperature responsive element in such cases does not serve as a correct guide to effect the proper fuel changes, it merely serves as a direct or indirect source of power to effect a hit or miss regulating movement of the valve based upon good or bad guesses by the human operators. One guess may be as good as another and the controller cannot help it that when the temperature is off 10° F. it makes an adjustment equivalent to that required if the temperature is off 200° F., regardless of the fact that the load condition causing this 10° change may or may not have any relation whatever to the controlling action.

The effect of this type of controller if adjusted as above described, is such as to induce hunting spells from which it is hard to escape when extreme fuel changes are made. This is because when off 10° F., really the fuel change should most likely only be $\frac{1}{10}$ of the effected fuel change, if the fuel change requirement or fuel demand happens to be only just enough to reduce the furnace temperature by 10°. Clearly then when the 10° deviation is a true indication of fuel change requirement the excessive fuel supplied, in conjunction with the temperature lag of the furnace, is most likely to cause the temperature to over-shoot. It is self-evident that this overshooting causes a further excessive and unwanted fuel change which reacts as a further extreme case of under-shooting, with constant repetitions, as because of the existing time lag, the effect of the fuel changes always lags behind. Although there may be times when the fuel supply momentarily is at a value which corresponds with the then existing temperature, there can be no breaking up of the oscillations because it is the effect of previous unproportionate or disproportionate temperature and fuel relations that determined the temperature trend at the time when temperature and fuel are actually in equilibrium. Only an accidental load or other condition change in the furnace or temporary hand control can break up the hunting.

Whenever the situation is one in which the load variations in the furnace never, or at least seldom, exceed a value that requires extreme fuel changes, a compromise can readily be made in practice to effect a reasonably satisfactory control that does not hunt.

This can be accomplished by being lenient with extreme conditions, and, as mentioned above, by extending the extreme control limits to + or − 15° or 20°, or whatever is found to be the necessary spread required to prevent the setting in of hunting. In general such an arrangement is more satisfactory to the operator as it is apt to give him a control well within the required limits + or −10° F., as only once in a while will he get, for a few minutes, excessive variation when the extreme load changes take place.

In many cases this above explained makeshift control set-up is preferred and is considered satisfactory. Whether or not this set-up is actually satisfactory or not, depends in practice on two conditions. First, whether or not the work to be heat-treated can stand the occasional greater variation in temperature; second, how often these extreme load changes take place, that is, is it too often to interfere with the quality of the work or not? This latter is naturally a practical question to be decided by the user, but it is a known fact that there are a great many furnace control installations where such additional fluctuations can not be tolerated.

To eliminate entirely hunting spells in this type of control system it is absolutely necessary to permit the temperature to vary at least ½ of the degrees of temperature, which would actually be caused by the extreme changing load conditions, where there are no fuel changes made to compensate therefor.

For example, assume a situation in which a given maximum load change causes the temperature to drop 200° from the normal 1400° and in which another load condition of the same furnace would cause the temperature to rise 200° above 1400°. In this case, to prevent hunting under any circumstances, the temperature variation required to effect extreme high or low fuel supply should be 100°+1400°, the extreme fuel supplies being the ones that under the conditions would maintain not 1400° but respectively 1300° and 1500°.

Actually, in practice, a controller so adjusted would normally run along and adjust the fuel requirement gradually as the temperature changes. As the temperature starts to drop the valve begins to open and a compromise will be struck between temperature deviation and fuel supply as follows: If for some time the given load condition does not change, then the temperature would settle down with a temperature around 1300° F. and a fuel supply around 150 cubic feet per hour. This gives about + or −100° F. control. In short, the foregoing should be sufficient to prove that controllers of this type really do not control. They only dampen or rather minimize the effect of load changes on the temperature condition. At their best they will cause a cutting in half of the temperature change that normally would occur were there no control on the furnace and no normal adjustment of the fuel supply.

They can never accomplish a condition where the temperature in all cases can remain or be brought to and maintained at, say 1400° with the fuel supply at either extreme or any in between value.

To approach proper control it would be essential that there be mechanism present which will automatically change the relation between the valve movement and the temperature movement, so that the temperature can approach or remain inside the desired control zone or at least be brought into this zone with the valve opening at any position that will supply the proper amount of fuel in each case.

It is among the objects of this invention to obviate deficiencies in the prior art of controlling systems for regulators; to provide a controlling system with mechanism arranged to automatically change the relation between the movement of the regulator and the movement of the condition responsive device so that the condition can approach or remain inside the desired control zone or can at least be brought into the zone with the regulator setting at any position supplying a proper amount of condition maintaining or creating medium; to provide a control system of great flexibility in adjustments; to provide a control system for condition regulators wherein an indicating device responds to conditions and actuates the regulator to maintain conditions within a predetermined range, the actuation being always as a function of the movement of the indicating device, but the function being predeterminedly small for small indicating device movement within the range, and being predeterminedly a higher function when the movement is outward bound past the limits of the range, and in the latter case being normally automatically followed by a return movement of the regulator, also as a different function of the indicating movement; and many other objects and advantages are contemplated which will be made more clear as the specification proceeds.

In the accompanying drawings forming part of this specification.

Figure 1:
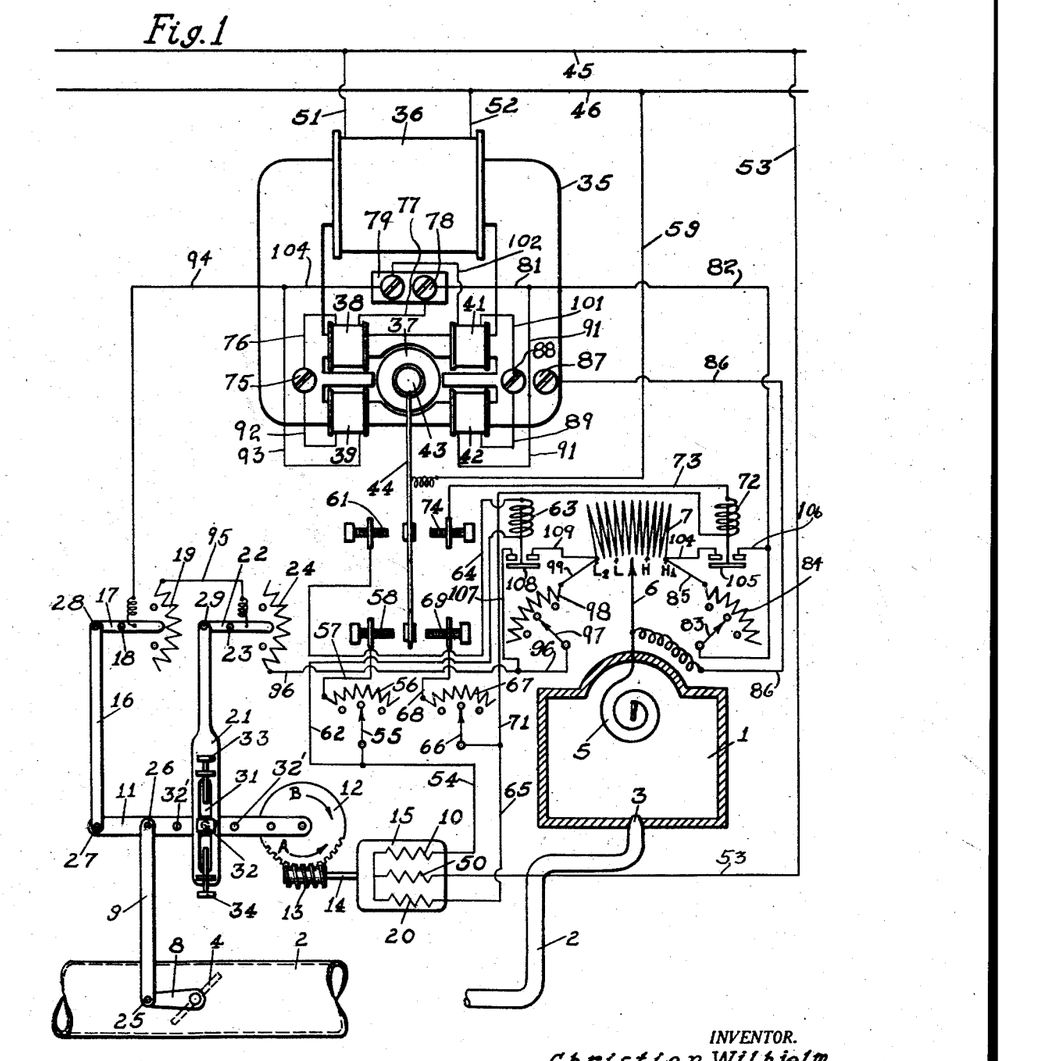
Fig. 1 represents a diagrammatic elevation partially in section and including a wiring diagram of the electric wiring connections joining the respective parts, and with the controlling contact arm 44 disposed in its neutral position.

Referring to Fig. 1 a furnace or oven to be heated is shown diagrammatically at 1, and is disclosed as having a fuel supply line 2 through which fuel such as gas, for instance, is fed to be burned in the furnace 1 as it emerges from the burner tip 3. The fuel supply line or pipe 2 is provided with a regulating valve 4 having a valve regulating handle 8. Operatively associated with the furnace 1 is a temperature responsive element 5, normally in the furnace, which connects with and controls and operates pointer arm 6, slidable or movable relatively to a section of a rheostat 7.

In order to secure automatic operation of the valve 4 and its handle 8 in the fuel line 2, a link 9 is provided pivotally engaging arm or handle 8 by pin 25 at one end, and pivotally engaging an operating arm 11 at its other end by a pin or pivot 26. Operating arm 11 is rigidly engaged with gear wheel 12 so as to project radially thereof, and the latter is in mesh with a worm 13 of a motor shaft 14. The reversible motor 15 driving shaft 14 is provided with two sets of field coils respectively 10 for driving the motor in a clockwise direction and 20 for driving or operating the motor in an anti-clockwise direction. It will be seen that through the driving relations thus described the operating arm 11 swings about the axis of gear wheel 12 as a pivot, moving link 9 vertically and actuating the valve 4. A rheostat 19 is provided the setting of which is controlled in synchronism with the operation of valve 4, by means of a link 16 pivoted at the lower end by bolt or pin 27 to operating arm 11 and at its upper end by bolt or pin 28 to a rheostat arm 17 having a pivotal fulcrum 18 and the free end of which arm is arranged to make electrical contact with the rheostat 19. A secondary operating link 21, of special construction, is provided, fastened to the operating lever 11 by means of a sliding pivot 32 sliding in a slot 31 in the link, and which sliding motion is adjustably restricted in both directions by the respective adjusting screws 33 and 34 as will be clear, while the upper end of link 21 connects by bolt 29 with a rheostat arm 22 having a pivotal fulcrum 23, and its free end slidably makes connection with rheostat coil 24.

As an important element in the control system there is provided a soft iron conventionally laminated frame 35 carrying a coil of wire 36 wound to be connected directly across the ordinary supply lines 45 and 46 of 110 or 220 volts, for instance. Coils 38, 39, 41 and 42 of comparatively heavy wire are mounted upon extensions of the iron framework 35 but the coils have no direct connection with the line voltage, being only designed and arranged to carry the induced current which will be caused to flow through the respective coils while current is passing through coil 36. A small rotor 37 preferably of iron with copper bars for shorted electric circuits and built substantially the same as the rotor of a standard A. C. motor is provided in operative association with the coils 38, 39, 41 and 42, and in the preferred form carries radially the flexible contact arm 44 anchored to the rotor shaft 43.

The disposition of the coils and the rotor 37 is such that torque is applied selectively to the rotor to swing the flexible contact arm 44 in desired directions and to desired degrees. Thus the direction of the windings of coils 39 and 41 is such that if shorted they act or serve as regular pole shading coils urging the rotor 37 to rotation in a clockwise direction when current passes through the coil 36 from the main supply line. The direction of the windings or turns of coils 38 and 42 is such that if shorted they will serve as shading coils and urge the rotor 37 to rotation in an anti-clockwise direction while the current passes through coil 36.

Figures 2, 3, 4, 5, 6:
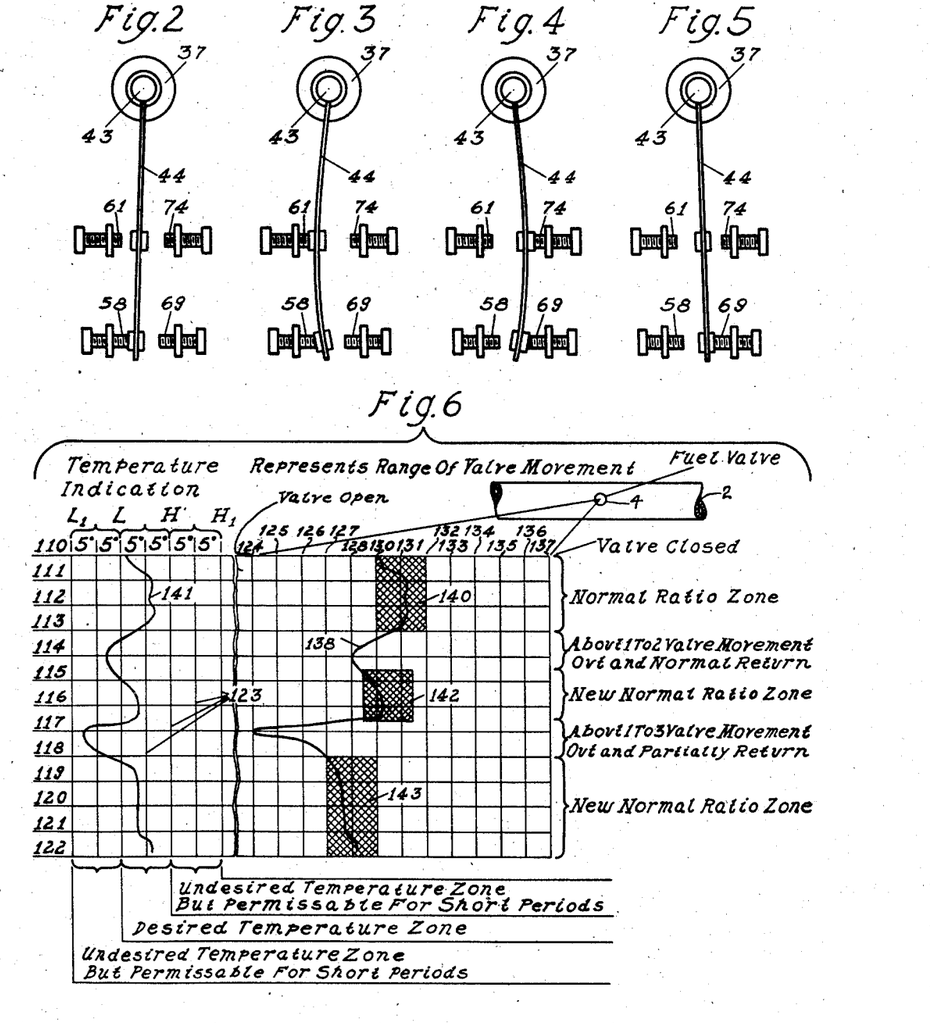
Figs. 2, 3, 4 and 5 represent diagrammatic elevations of the contact arm 44 shown respectively in the remaining four of its five condition adjusted positions.
Fig. 6 represents a diagrammatic disclosure of the fluctuations in condition in given intervals and the controlled fluctuations in valve setting responsive to the condition changes in the same time intervals.

It should be noted in connection with the coil and rotor system that there are two separate electric wiring systems. The first is the primary coil 36 fed by a service supply 51 and 52 through the main lead wires 45 and 46, and, secondly, a secondary circuit system which gets its electric current by induction through the coils 38, 39, 41 and 42. Another primary circuit is available to operate the motor 15 in a clockwise direction running as follows: From line 45 through wire 53 to motor armature winding 50 through field 10, wire 54 to rheostat arm 55, rheostat 56, wire 57, contact 58, and, if arm 44 touches contact 58, as shown in Fig. 2, through arm 44 and wire 59 back to the other line 46, thus completing a circuit arranged to operate motor 15 slowly in a clockwise direction. In this connection it will be clear that the speed of the motor depends upon the position of the rheostat arm 55 and relative to rheostat 56. This clockwise motor driving circuit may be automatically modified during the operation of this control system in the manner now to be described. If the turning force of the rotor 37 is sufficiently great as to cause flexible arm 44 to flex so as also to touch contact 61, as well as contact 58, as shown in Fig. 3, then the resistance of rheostat 56 will be shorted out as follows: The circuit will then be from line 45, wire 53, armature 50, field 10, wire 54, wire 62, low resistance relay coil 63, wire 64, contact 61, flexible arm 44, wire 59 back to the other line 46. When this circuit is closed the motor 15 will run clockwise at high speed. An identical but oppositely directed circuit is available to operate the motor 15 in an anti-clockwise direction and is substantially as follows: From line 45 through wire 53, armature 50, field 20, wire 65, to rheostat arm 66, rheostat 67, wire 68, contact 69, and if the flexible arm 44 is in the position shown in Fig. 5 through the flexible arm 44 and wire 59 back to the other line 46, thus operating the motor 15 slowly in an anti-clockwise direction, the speed of which depends upon the adjustment of rheostat 67. If the flexible arm 44 responds to increase of torque on rotor 37 to move from the position shown in Fig. 5 to the position shown in Fig. 4, then the rheostat 67 is shorted out as follows: The circuit then comes from line 45, wire 53, armature 50, field coil 20, wire 65, wire 71, low resistance relay coil 72, wire 73, contact 74, arm 44, wire 59, back to the other line 46, thus cutting out the resistance in the circuit to the motor and permitting it to run in an anti-clockwise direction at high speed.

Obviously any other desired mechanism or motor device could be used to secure control of the contacts 44, 58, 69, 61 and 74.

The secondary circuit consists of two double opposing induction circuits. One circuit can be traced as follows: The laminated iron core 35 serves as a convenient "ground" or common conductor. One circuit starts from the connecting screw 75, wire 76, coil 38, wire 77 to the connecting screw 78 on the insulated block 79, wire 81, wire 82, rheostat arm 83, wire 85, part of resistance wire 7, contact pointer 6, thermostat 5, wire 86 to connecting screw 87, thus completing a circuit as screws 75 and 87 are both in metallic connection with each other. The following circuit is parallel therewith. From connecting screw 88, wire 89, coil 42 and wire 91 which joins the first mentioned circuit at the junction between wires 81 and 82. The windings in the two coils 38 and 42 are wound in such a direction that their induced currents are synchronized.

The other double circuit runs as follows: From connecting screw 75, wire 92, coil 39, wire 93, wire 94, rheostat arm 17, rheostat 19, wire 95, rheostat arm 23, rheostat 24, wire 96, rheostat arm 97, rheostat 98, wire 99, part of resistance wire 7, contact pointer 6, thermostat 5, wire 86 and contact screw 87. The circuit paralleling it is contact screw 88, wire 101, coil 41, wire 102, contact screw 103, wire 104, to wire 94 where it joins the first mentioned circuit.

The windings in coils 39 and 41 are so arranged that the polarities of the two circuits are synchronized. There is a short circuit connection from the junction of resistance wire 7 and wire 85 designated by wire relay armature 105 and wire 106 to wire 82. When the coil 72 is energized, armature 105 is pulled up and closes this circuit thus cutting out of the circuit the resistance of rheostat 84.

Another short circuiting circuit is effective when the coil 63 is energized as follows: Rheostat arm 97, wire 96, wire 107, armature 108, wire 109 to the junction between wire 90 and resistance wire 7, thus cutting out the entire resistance of the rheostat 98 when the armature 108 is pulled up by coil 63.

Following the previous explanation where it was stated that the current flow through coils 39 and 41 tends to turn the rotor 37 in a clockwise direction with a torque proportional to the strength of the induced current flowing it will be clear that this depends on the resistance of the coils 39 and 41 and rheostats 19 and 24.

The operation of the equipment is as follows: First it being assumed that a status quo exists and the temperature remains steady within the furnace 1 and that this temperature is such that the thermostat 5 will cause the pointer 6 to remain steady in a position on the rheostat 7 in between the points indicated by the marks L and H. This zone should be considered the safe operating range. The two zones of the temperature range represented by the sections of the rheostat 7 and shown by the distances between the letters L and L₁ as well as between the letters H and H₁ should be the zones into which the temperature might safely go for short periods without any harm to the processing taking place in the furnace 1.

With the above condition existing it is assumed also that all parts of the apparatus have functioned to conform with such a condition and therefore a complete balance of the secondary circuit exists. That means that the position of each of the three rheostat arms, pointer 6, arm 17 and arm 22, is such in relation to its respective rheostat that the current passing through both sets of shading coils 38, 42 and 39, 41 is equal in strength. This equalization therefore outbalances or neutralizes any turning torques on the rotor 37, hence the weight of the contact arm 44 or any other desired agency, such as a spring (not shown), will cause armature 37 and contact arm 44 to remain neutral as it is shown in Fig. 1. As previously described all the primary circuits reacting on the motor 15 are controlled and made or broken through contact arm 44 so there can be no movement of the motor 15 or its connected mechanism so long as the pointer 44 remains in the neutral position anywhere.

The next assumption is that the temperature in the furnace goes slightly high so as to cause movement of arm 6 within the control range or neutral zone but does not rise enough to cause pointer 6 to move across or above the point indicated by the point marked H. Assume in this discussion, for purely illustrative purposes, that the rheostat 7 has a total of 60Ω with 20Ω between L and H and 20Ω between both L and L₁ and between H and H₁.

Now, therefore, if the pointer 6 moves (from a condition of balance) towards H on the rheostat to the extent of 5Ω then the circuit of coils 38 and 42 has been reduced by 5Ω hence there is a difference of 10Ω in the circuits to the respective pairs of coils, the pairs 38, 42 having the less resistance in its circuit and therefore subject to a stronger current flow than coils 39, 41, hence rotor 37 with contact arm 44 will turn counter-clockwise with a torque, a function of the unbalance, and arm 44 will make contact with contact 69. By so doing a circuit is closed, as previously explained, through rheostat 67 and field coil 20, etc. to operate the motor 15 in a counter-clockwise direction and this will, through the worm 13, cause gear 12 to move in a counter-clockwise direction indicated by arrow A. This movement will cause the operating arm to move downward causing link 9 to operate the valve 4 towards closed position; likewise, through the instrumentality of link 16, rheostat arm 18 will slide upward on rheostat 19 thus decreasing the resistance of the circuit through coils 39 and 41. Thus valve closing will take place until a synchronized rheostat movement has been made sufficient to reduce the resistance in this torque creating circuit till it equals the circuit through coils 38, 42 when the torques equalize and arm 44 again takes a neutral position. Clearly, at this moment the valve movement has stopped.

It may here be mentioned that it is first assumed that this movement of the temperature is the first in this direction after temperature movements in the low direction, and if so the sliding bolt 32 has been permitted to work freely and unrestrainedly in the slot of link 21 out of contact with set screws 33 and 34 and the rheostat 24 has not been affected by the moving of the rest of the control mechanism. It is here assumed that the rheostats are so proportioned that while the pointer moves within the control range (between L and H) the valve movement caused by a degree of temperature change is an amount that under normal average conditions in the particular furnace would change the temperature one degree in the opposite direction. (This may not be exactly true in practice, but in theory this may be assumed to represent the ideal condition. In practice local conditions may make it desirable to make the valve movement somewhat greater.) This degree of adjustment should result in the condition stabilizing itself again, with the temperature within the control range, substantially in the following illustrative manner: A condition change that would cause a 4° temperature change would result in a new balance with the temperature off in a new position 2° (but within the control range), and a new fuel supply off the previous value an amount that would alter the temperature 2°. It will readily be seen that no overadjustment can take place. The fuel change takes place just as fast or just as slow as, and as a direct function of, the temperature change, but the amount of change in the fuel supply is definitely controlled by the temperature change, and it is evident that so long as this temperature change is within the desired limit the slight permanent change (comparatively and relatively speaking) in temperature to effect the fuel change is entirely satisfactory.

It will now be assumed that the above change in temperature is in the same direction as the last previous change, or is followed by a further change in the same direction, that is, as an example, the temperature continues to rise an amount equal to or greater than the temperature change represented by the 20 Ω resistance between L and H. As an example this may be determined to represent 10° F. It may be even less than 10° F. if the relation of arm 6 and rheostat 7 is such at the start of the relative movement that a smaller change causes arm 6 to cross point H. (Theoretically the adjustment of the two adjusting screws 33 and 34 should be such that a movement of the operating arm that will change the rheostat 19 as much as 20 Ω should make the bolt 32 travel in the slot 31 of arm 24 from one end of its free movement to the other. In practice varying conditions may require a somewhat different adjustment.) Under such conditions it is evident that the furnace condition causing the temperature change is such that a greater proportional change of fuel to temperature change is essential to stop the trend of the temperature change. Now in following the diagram it will readily be seen that with the instant control system this is accomplished in several ways, still as a predetermined but different function of the unbalance, automatically depending entirely upon the way the temperature changes, at least as competently as an experienced human operator would effect fuel changes.

First, as soon as the temperature deviates outside the L to H zone on a continuous temperature change, the head of bolt 32 will hit either of the two screws 33 and 34 and therefore move lever 21, rheostat arm 22, as well as rheostat arm 17. It will readily be seen from the drawings that the two rheostats work in opposition to each other. If resistance is cut out of the circuit by rheostat 19 resistance is introduced into the circuit by rheostat 24 and vice versa. The ratio of movement of the two rheostats is adjustable but, as an example, it might be two to one so that if rheostat 19 for a given movement of arm 11 cuts out 10 Ω of the circuit, rheostat 24 for the same given movement of arm 11 cuts in 5 Ω, and therefore it is evident that the lever system must be moved twice as far to outbalance a temperature change with both rheostats moving as before when only rheostat 19 operates, and as the valve is linked to the rheostat levers it will also be moved twice as far for a given temperature change. The ratio between the movement of the two rheostat arms can be adjusted by any desired means such as by locating lever arm or links and the bolt 32 selectively in openings 32' of arm 11 to give the increase in valve movement most suited to the particular furnace conditions. One more thing has been accomplished when rheostat 24 has been so functioned, and that is that the position of the valve in relation to the desired control zone has been changed so that as the temperature eventually returns to within the desired zone the valve will either be further open or further closed depending on whether the temperature went down or up. In other words, continual temperature changes will balance the fuel supply to the new fuel demand at any time so long as this supply is within the range of the valve capacity.

If the temperature changes are slow it is desired that the speed at which the valve position or setting changes should be slow in order not to make unnecessary sudden changes in and to the combustion conditions in the furnace. There may be times however when the furnace conditions change faster than normal and generally a fast temperature change indicates that a rather violent change of furnace conditions has occurred which eventually will cause a temperature change of great magnitude and which it is of importance to stop quickly before it has indicated its extent.

The theoretically ideal control will respond to a sharp drop in the temperature, will quickly move the valve a large amount, will watch the temperature and change the valve back again partly to where it was originally. This is here done entirely automatically as follows:

If the temperature change progresses faster than the fuel valve is adjusted it is evident that there will be an increased unbalancing resulting in a greater turning torque of armature 37 which will result in a flexing right or left of contact arm 44 and if this unbalance becomes great enough (its time of function can be adjusted by the two contact screws 61 and 74) so that the arm either touches contact screw 61 or 74, selectively and alternatively one of the rheostats 56 or 67 is cut out of the motor circuit and the motor operates at full speed in order to quickly catch up with the temperature change occurring. At the same time it will be noted that such shorting of either rheostat 56 or 67 will energize either coil 63 or coil 72, respectively, and then either rheostat 98 or 84, respectively, will suddenly be shorted out and its resistance withdrawn from their respective sides of the secondary circuits so that the unbalancing already existing is temporarily increased with whatever amount these rheostats are set for. By this means the theoretically ideal first action, above noted, of a large change in the valve setting, is accomplished because the motor has to move the rheostats 19 and 24 until they have not only outbalanced the resistance change caused by the movement of contact pointer 6 but also the additional resistance introduced into the circuit. The added unbalancing attaching to shorting out resistances 98 and 84 obviously gives the same resultant (but strictly temporary) effect as though arm 6 and rheostat 7 had relatively moved a much greater amount or distance to enforce a much greater valve movement than the actual temperature indication of pointer 6 would indicate as necessary, but without the disadvantage of waiting until the pointer has actually reached such extreme setting as would secure the degree of unbalance now secured by shorting out resistances 98 or 84.

As the new balance is approached, either due to the sufficient shift of rheostates 19 and 24 or by a beginning of the reverse temperature movement or temperature change, then the contact arm 44 ceases to contact at either 61 or 74. The fast running of the motor will stop, the flow of current through relay coils 63 or 72 causing its respective armatures to fall out, whereby the resistance of rheostats 98 or 84 temporarily cut out is introduced in the circuit. This will cause an unbalancing of the circuits in the opposite direction so that contact arm 44 will close the opposite primary circuit to the motor and run same normally at slow speed and operate the rheostat 19, and possibly a little later rheostat 24, with the valve in the opposite direction, but not completely as far back again. Just how far back the valve will move depends on the adjustment of the screws 33 and 34 as a fixed factor, (adjusted to suit the particular conditions), but temperature conditions and the rate of temperature change back towards the desired holding zone becomes the governing factor in how fast and how much the fuel supply is to be permanently changed, in order to check the assumed change in furnace condition.

In order to illustrate the relationship between movements of the condition responsive device, illustratively a temperature responsive device, and movements of the condition regulator, illustratively a fuel valve, the diagrammatic disclosure of Fig. 6 may be considered. Obviously the ratios and relations shown are purely arbitrary and may easily and quickly be altered in any desired manner through the novel and useful variation control of the highly elastic system disclosed.

In the diagram of Fig. 6, it may be assumed that the horizontal lines represent components of time, beginning at any arbitrary time interval at the top, as at 110, 111, 112, etc., down to 122, during which successive time intervals enough transpires as to illustrate the methods of the system.

At the left side of the figure there are a series of vertical lines 123 representing a selected band of temperature range including a central band of 5° and 5° comprising the 10° zone between L and H, and on either side the bands of 10° each, of L to L1 and H to H1. As noted the latter two bands are those in which the temperature may move for short intervals without harmful results to the work in the furnace.

At the right side of Fig. 6 there are a series of valve positions indicating vertical lines respectively 124, indicating the fully open valve position, 125, 126, through 137, which latter represents the fully closed valve position.

It will be observed that for the time instant 110, the valve position indicated by curve or graph 138 is in a normal zone marked by the shading 140 extending over two valve position lines, between 130 and 132, and all valve positionings during time intervals 110—111, 111—112, 112—113 are in this as might be termed valve setting zone. During these same time intervals it will be observed that the curve or graph 141 has made slow back and forth movements in its control zone L—H accompanied by direct functional and proportional movements of the valve.

As time interval 112 to 113 is passed, and 113 to 114 elapses the temperature responsive means has begun a swing past line L in the zone L—L1. As this is a trend that must be quickly stopped, the mechanism functions so that although the temperature deviation is as shown, but half of the 5° between L and the adjacent 5° line in the L—L1 zone, yet in the manner already described the ratio of temperature variation to valve variation has automatically changed. The function is predetermined but is different from the function of the initial slow valve movement following slow temperature variation in the zone L—H. Illustratively the ratio is now 1 to 2, so that pursuant to temperature change 2½° the valve movement is equivalent to the normal change for 5° temperature variation. Thus in the time interval between 113 and 114 the valve has moved open toward line 128. This valve movement has evidently checked the temperature deviation, so that in the time interval 114—115 it begins to work back toward the normal control range of L—H. However the turn of the temperature causes the reverse running of the valve actuating motor but only a degree directly balanced by adjustments of rheostat 19, so that the return movement of the valve is a different function of temperature variation from the outbound movement. The return movement of the valve finds it in a new normal valve range 142, which is slightly closer to open valve position as shown in Fig. 6.

In the new normal valve setting range 142, the fluctuations and variations in valve setting follow the slow fluctuations of the temperature variation within zone L—H, until in time interval 116—117, for example, the temperature line suddenly moves out from its substantial mid-position almost to the far limits of zone L—L1. This situation is occasioned for example by the sudden insertion into the furnace of large cold work. It must be checked rapidly. As the unbalance proceeds faster than it can be balanced by the rheostat synchronized with the valve movement, the motor runs at high speed and, as shown, moves the valve to fully open position, even though the temperature variation did not go a directly proportional distance. It will be understood that again the proportionality changes automatically (as now the effective unbalance is increased by the operation of relay 63 which shorts out resistance 98) so that although it causes a high speed valve movement, the valve movement is now more than twice and even three times (for instance) the temperature variation movement before balance can be secured. The temperature variation responds to this drastic treatment and the outbound change is stopped between 116 and 118, and during this time the valve for a short time has been fully opened, followed very quickly by a return closing movement, pursuant to the change in temperature variation. The returning or closing movement is a directly proportional or primary function of the temperature return to normal so that when between time intervals 118 and 119 the temperature return across line L into zone L—H, finds the valve position in a new zone 143, while the temperature in the furnace is still within the normal zone L—H.

Thus it will be seen that the normal operating zone of the valve or regulator can be anywhere in its range of movements while still maintaining the proper furnace temperature.

The zones 140, 142 and 143 for the valve or regulator are those zones in which normal slow condition responsive movements within the safe operating range are followed by normal slow valve or regulator movements within the particular valve zone. The zone limits are those set by the adjustments of the set screws that govern the lost motion between the arm actuating the valve and the modifying rheostat, and the location of any valve zone is that at which, after a set screw has been engaged to actuate the modifying rheostat, a reversal of condition moves the arm away from the set screw. This is believed to be clear.

It is believed also that it will be clear that there are certain definite combinations of resistances, according to settings and conditions, each of which is a function of the variation in condition, but which is obviously a different function in each case in accordance with whether, for instance, rheostat 7 working with rheostat 19, has resistance 84 or 98 either in the circuit or cut out of the circuit, and whether with the same operative rheostat and resistance combinations the modifying rheostat 24 is operated or not operated. The fact that rheostat 24 is actuated in one direction, through the lost motion connection, insures that it will not be operated in reverse, and this will cause different running of the motor in each direction, as each will be as a different function of condition variation.

The manifold uses of the invention and the manifest advantages thereof as a method and means of maintaining within close limits conditions of temperature, pressure humidity, chemical reactions and the like, will be clear from the foregoing, as will the fact that many modifications and changes in the system and methods set forth, and such are to be construed as within the scope of the invention unless otherwise definitely limited in the attached claims.

I claim:

1. The method of automatically controlling a condition substantially at a given value which comprises varying the condition controlling means a degree a predetermined function of the deviation of the condition from the given value, the function being automatically variable in accordance with the degree of deviation of the condition from the given value, and in retaining a substantial portion of the variation in the condition controlling means when the deviation in condition is checked and the condition returns to the given value.

2. The method of automatically controlling a condition substantially at a given value within a limited permissible range including a smaller inner range of preferred condition, which comprises varying the condition controlling means as a function of the deviation of the condition within the preferred range, and which comprises automatically varying the condition controlling means as a different function of the deviation of the condition beyond the preferred condition within the permissible range and in retaining a substantial portion of the variation in the condition controlling means when the deviation in condition is checked and the condition returns to the inner range.

3. The method of automatically controlling a condition substantially at a given value within a limited permissible range including a smaller inner range of preferred condition, which comprises varying the condition controlling means as a function of the deviation of the condition within the preferred range, and which comprises automatically varying the condition controlling means as a different function of the deviation of the condition beyond the preferred condition within the permissible range, and comprises varying the condition controlling means at a rate of speed substantially proportional to the rate of deviation of the condition in either range and in retaining a substantial portion of the variation in the condition controlling means when the deviation in condition is checked and the condition returns to the inner range.

4. The method of automatically controlling a condition substantially at a given value which comprises determining the amount of variation of condition controlling means that normally would modify the condition enough to compensate for small variations in condition within a given range of value, in governing the variation in condition controlling means in accordance with small variations in condition within a given range, in governing the variation in condition controlling means a predeterminedly greater amount in response to deviations in condition beyond the limits of said range, and when the variation in condition has been checked and a return toward the given value has been made by the condition pursuant to the response to condition deviation beyond the limits of said range to change the condition controlling means in the opposite direction an amount a function of the opposite deviation of condition but smaller in volume than the previous change in the opposite direction.

5. The method of automatically controlling a condition substantially at a given value which comprises determining the amount of variation of condition controlling means that normally would modify the condition enough to compensate for small variations in condition within a given range of value, in governing the variation in condition controlling means in accordance with small variations in condition within a given range, in governing the variation in condition controlling means a predeterminedly greater amount in response to deviations in condition beyond the limits of said range, and when the variation in condition has been checked and a return toward the given value has been made by the condition pursuant to the response to condition deviation beyond the limits of said range to change the condition controlling means in the opposite direction an amount a function of the opposite deviation of condition but smaller in volume than the previous change in the opposite direction, and varying the rate of said deviation in condition controlling means in accordance with the rate of variation in said condition.

6. The method of automatically controlling a condition substantially at a given value which consists in measuring the extent of variation from said given value, and in governing the application of the condition creating means thereby, first if the variation from the given value is small and within the desired range in amounts substantially equal to the amount that normally would compensate for the variation, and second if the variation is greater than the desired and permissible variation to change the value of the condition creating means to a substantially greater amount but still an amount which is a function of the measured variation, then third when the variation has been checked and a return towards the given value is effected to change the value of the condition creating means in the opposite direction an amount a function of the measured value of return of the controlled condition but smaller in amount than the previous change in the opposite direction and in cooperation with the above mentioned controlling actions to govern the speed with which the changes in the values of the condition creating means takes place to be slow when the deviation of the controlled condition is slow and fast when the deviation of the controlled condition is fast.

7. A regulator controlling system comprising means arranged to manifest a condition, a condition responsive means, a regulating means for controlling the condition, an electric system operatively associated with the regulating means and with the responsive means and arranged to actuate the regulator as a function of the deviation of the responsive means within a predetermined range to modify the condition to urge it to remain such that the responsive means remains within the desired range, means responsive to deviation of the condition responsive means beyond the limits of the predetermined range to modify the electrical system so that the regulating means is actuated as a different function of the deviation within a wider predetermined range to secure a greater variation of the regulator to check the trend of the condition, the whole so constructed and arranged as to retain a substantial portion of the variation in the regulating means when the deviation of the condition is checked and the condition returns to the desired range.

8. A regulator controlling system comprising means arranged to manifest a condition, a condition responsive means, a regulating means for controlling the condition, an electric system operatively associated with the regulating means and with the responsive means and arranged to actuate the regulator as a function of the deviation of the responsive means within a predetermined range to modify the condition to urge it to remain such that the responsive means remains within the desired range, means responsive to deviation of the condition responsive means beyond the limits of the predetermined range to modify the electrical system so that the regulating means is actuated as a different function of the deviation within a wider predetermined range to secure a greater variation of the regulator to check the trend of the condition, said electric system arranged to actuate the regulator at two different rates of speed selectively according to the speed of the deviation of the condition responsive means.

9. A regulator controlling system comprising means arranged to manifest a condition, a condition responsive device, an electrical system including a rheostat actuated by the condition responsive device, a normally open electrically actuated circuit controller selectively controlling a pair of circuits, a motor having a pair of fields in the respective last mentioned circuits, a condition regulator actuated by said motor, a rheostat actuated in synchronism with said regulator and normally balancing the resistance of the first mentioned rheostat and maintaining balance in the circuit of said circuit controller, said condition responsive rheostat being arranged to unbalance the circuit controller circuit and to close a circuit through the motor to move the regulator and synchronously the second mentioned rheostat to balance the circuit through the circuit controller to break said driving circuit.

10. A regulator controlling system comprising means arranged to manifest a condition, a condition responsive device, an electrical system including a rheostat actuated by the condition responsive device, a normally open electrically actuated circuit controller selectively controlling a pair of circuits, a motor having a pair of fields in the respective last mentioned circuits, a condition regulator actuated by said motor, a rheostat actuated in synchronism with said regulator and normally balancing the resistance of the first mentioned rheostat and maintaining balance in the circuit of said circuit controller, said condition responsive rheostat being arranged to unbalance the circuit controller circuit and to close a circuit through the motor to move the regulator and synchronously the second mentioned rheostat to balance the circuit through the circuit controller to break said driving circuit, a modifying rheostat, means having a predetermined lost motion in synchronism with the regulator operable after a given regulator movement to actuate the modifying rheostat to modify the circuit through the circuit controller to cause a predeterminedly greater regulator movement before balancing of the circuit through the circuit controller.

11. A regulator controlling system comprising means arranged to manifest a condition, a condition responsive device, an electrical system including a rheostat actuated by the condition responsive device, a normally open electrically actuated circuit controller selectively controlling a pair of circuits, a motor having a pair of fields in the respective last mentioned circuits, a condition regulator actuated by said motor, a rheostat actuated in synchronism with said regulator and normally balancing the resistance of the first mentioned rheostat and maintaining balance in the circuit of said circuit controller, said condition responsive rheostat being arranged to unbalance the circuit controller circuit and to close a circuit through the motor to move the regulator and synchronously the second mentioned rheostat to balance the circuit through the circuit controller to break said driving circuit, a modifying rheostat, means having a predetermined lost motion in synchronism with the regulator operable after a given regulator movement to actuate the modifying rheostat to modify the circuit through the circuit controller to cause a predeterminedly greater regulator movement before balancing of the circuit through the circuit controller, and means operative pursuant to balancing of the circuit controller circuit and to the start of return of the condition responsive rheostat toward the given range to reverse the motor and regulator as a smaller function of said rheostat movement.

12. A regulator controlling system for conditioned instrumentalities comprising a circuit controller having a normal mid-position and primary and secondary contacting positions on each side of the mid-position, controlling electric circuits, an electrical agency operatively associated with the circuit controller and arranged operatively with the controlling electrical circuits and arranged with balance of the circuits to establish the mid-position of the circuit controller, and with selective unbalance of the circuits to urge the controller to selectively close the primary as a primary function of unbalance of the circuits, and then the secondary contacts as a secondary function of the unbalance of the circuits, a condition responsive rheostat in the controlling circuits, a synchronous rheostat in the controlling circuits, a modifying rheostat in the circuits, a motor having a field energized by the primary contact closing, a regulator operated by the motor, means coupling the regulator with the synchronized rheostat so arranged that unbalance of the control circuits by the condition responsive rheostat incident to a change of condition energizes the circuit controller to close the primary contact to drive the motor to actuate the regulator a predetermined distance when the synchronized rheostat will have balanced the controlling circuits to return the circuit controller to mid-position and stop the running of the motor.

13. A regulator controlling system for conditioned instrumentalities comprising a circuit controller having a normal mid-position and primary and secondary contacting positions on each side of the mid-position, controlling electric circuits, an electrical agency operatively associated with the circuit controller and arranged operatively with the controlling electrical circuits and arranged with balance of the circuits to establish the mid-position of the circuit controller, and with selective unbalance of the circuits to urge the controller to selectively close the primary as a primary function of unbalance of the circuits, and then the secondary contacts as a secondary function of the unbalance of the circuits, a condition responsive rheostat in the controlling circuits, a synchronous rheostat in the controlling circuits, a modifying rheostat in the circuits, a motor having a field energized by the primary contact closing, a regulator operated by the motor, means coupling the regulator with the synchronized rheostat so arranged that unbalance of the control circuits by the condition responsive rheostat incident to a change of condition energizes the circuit controller to close the primary contact to drive the motor to actuate the regulator a predetermined distance when the synchronized rheostat will have balanced the controlling circuits to return the circuit controller to mid-position and stop the running of the motor, a resistance in the motor driving circuit through the primary contacts, a circuit through the secondary contacts on the selected side of the circuit controller shorting out said last mentioned resistance and running the motor at a higher speed when the unbalance of the circuit caused by the condition responsive rheostat is predeterminedly greater and occurs faster than the cancellation thereof by the synchronized rheostat.

14. A regulator controlling system for conditioned instrumentalities comprising a circuit controller having a normal mid-position and primary and secondary contacting positions on each side of the mid-position, controlling electric circuits, an electrical agency operatively associated with the circuit controller and arranged operatively with the controlling electrical circuits and arranged with balance of the circuits to establish the mid-position of the circuit controller, and with selective unbalance of the circuits to urge the controller to selectively close the primary as a primary function of unbalance of the circuits, and then the secondary contacts as a secondary function of the unbalance of the circuits, a condition responsive rheostat in the controlling circuits, a synchronous rheostat in the controlling circuits, a modifying rheostat in the circuits, a motor having a field energized by the primary contact closing, a regulator operated by the motor, means coupling the regulator with the synchronized rheostat so arranged that unbalance of the control circuits by the condition responsive rheostat incident to a change of condition energizes the circuit controller to close the primary contact to drive the motor to actuate the regulator a predetermined distance when the synchronized rheostat will have balanced the controlling circuits to return the circuit controller to mid-position and stop the running of the motor, a resistance in the motor driving circuit through the primary contacts, a circuit through the secondary contacts on the selected side of the circuit controller shorting out said last mentioned resistance and running the motor at a higher speed when the unbalance of the circuit caused by the condition responsive rheostat is predeterminedly greater and occurs faster than the cancellation thereof by the synchronized rheostat, a resistance in the circuit of the condition responsive rheostat, a relay in the motor driving circuit through the secondary contacts arranged upon energization to short out said last mentioned resistance from the condition responsive rheostat to increase the unbalance of the controlling circuits to increase the extent of high speed regulator action before cancellation and balance can be secured by said synchronized rheostat.

15. A regulator controlling system comprising means arranged to manifest a condition, a condition responsive device, an electrical system including a rheostat actuated by the condition responsive device, a normally open electrically actuated circuit controller selectively controlling a pair of circuits, a motor having a pair of fields in the respective last mentioned circuits, a condition regulator actuated by said motor, a rheostat actuated in synchronism with said regulator and normally balancing the resistance of the first mentioned rheostat and maintaining balance in the circuit of said circuit controller, said condition responsive rheostat being arranged to unbalance the circuit controller circuit and to close a circuit through the motor to move the regulator and synchronously the second mentioned rheostat to balance the circuit through the circuit controller to break said driving circuit, a modifying rheostat, means having a predetermined lost motion in synchronism with the regulator operable after a given regulator movement to actuate the modifying rheostat to modify the circuit through the circuit controller to cause a predeterminedly greater regulator movement before balancing of the circuit through the circuit controller, and means operative pursuant to balancing of the circuit controller circuit and to the start of return of the condition responsive rheostat toward the given range to reverse the motor and regulator as a smaller function of said rheostat movement, means actuating the modifying rheostat and modifying the balancing of the controlling circuits in such manner that greater regulator action must be had before balance is secured and the motor stopped in its running.

16. A regulator controlling system comprising means arranged to manifest a condition, a condition responsive device, an electrical system including a rheostat actuated by the condition responsive device, a normally open electrically actuated circuit controller selectively controlling a pair of circuits, a motor having a pair of fields in the respective last mentioned circuits, a condition regulator actuated by said motor, a rheostat actuated in synchronism with said regulator and normally balancing the resistance of the first mentioned rheostat and maintaining balance in the circuit of said circuit controller, said condition responsive rheostat being arranged to unbalance the circuit controller circuit and to close a circuit through the motor to move the regulator and synchronously the second mentioned rheostat to balance the circuit through the circuit controller to break said driving circuit, a modifying rheostat, means having a predetermined lost motion in synchronism with the regulator operable after a given regulator movement to actuate the modifying rheostat to modify the circuit through the circuit controller to cause a predeterminedly greater regulator movement before balancing of the circuit through the circuit controller, and means operative pursuant to balancing of the circuit controller circuit and to the start of return of the condition responsive rheostat toward the given range to reverse the motor and regulator as a smaller function of said rheostat movement, means actuating the modifying rheostat and modifying the balancing of the controlling circuits in such manner that greater regulator action must be had before balance is secured and the motor stopped in its running, a resistance in the motor driving circuit through the primary contacts, a circuit through the secondary contacts on the selected side of the circuit controller shorting out said last mentioned resistance and running the motor at a higher speed when the unbalance of the circuit caused by the condition responsive rheostat is predeterminedly greater and occurs faster than the cancellation thereof by the synchronized rheostat.

17. A regulator controlling system comprising means arranged to manifest a condition, a condition responsive device, an electrical system including a rheostat actuated by the condition responsive device, a normally open electrically actuated circuit controller selectively controlling a pair of circuits, a motor having a pair of fields in the respective last mentioned circuits, a condition regulator actuated by said motor, a rheostat actuated in synchronism with said regulator and normally balancing the resistance of the first mentioned rheostat and maintaining balance in the circuit of said circuit controller, said condition responsive rheostat being arranged to unbalance the circuit controller circuit and to close a circuit through the motor to move the regulator and synchronously the second mentioned rheostat to balance the circuit through the circuit controller to break said driving circuit, a modifying rheostat, means having a predetermined lost motion in synchronism with the regulator operable after a given regulator movement to actuate the modifying rheostat to modify the circuit through the circuit controller to cause a predeterminedly greater regulator movement before balancing of the circuit through the circuit controller, and means operative pursuant to balancing of the circuit controller circuit and to the start of return of the condition responsive rheostat toward the given range to reverse the motor and regulator as a smaller function of said rheostat movement, means actuating the modifying rheostat and modifying the balancing of the controlling circuits in such manner that greater regulator action must be had before balance is secured and the motor stopped in its running, a resistance in the circuit of the condition responsive rheostat, a relay in the motor driving circuit through the secondary contacts arranged upon energization to short out said last mentioned resistance from the condition responsive rheostat to increase the unbalance of the controlling circuits to increase the extent of high speed regulator action before cancellation and balance can be secured by said synchronized rheostat.

18. A regulator controlling system for maintaining a condition within a given range comprising a device arranged to manifest condition, condition responsive means, a regulator for controlling the condition, means for adjusting the regulator as a function of deviation of the condition relative to the given range, means for adjusting the regulator as a different function of the deviation of the condition relative to another part of said given range, and means for adjusting the regulator as a still different function of the deviation of the said condition relative to said given range.

19. In a control system, a condition responsive rheostat, a valve controlling such condition, an electrical controlling system including a motor for actuation of the valve, a circuit closure controlling two circuits, means responsive to small rheostat variations for moving the circuit closure to control one circuit through the motor, a resistance in said last mentioned circuit, means responsive to a greater rheostat variation to actuate the circuit closure to close the said second of the two circuits, a circuit controlled by said last mentioned circuit closing to short out said resistance to increase the motor speed, and means automatically operated subsequent to said fast running of the motor and upon breaking of the last mentioned circuit to reverse the running of the motor to actuate the valve in the opposite direction to a different extent than the high speed running.

20. An automatic condition control system comprising in combination a valve affecting conditions, condition responsive means, means in interlocking driving relation with and between the responsive means and the valve to govern their relative positions and predeterminedly their relative movements as a function of the movement of the responsive means, means for automatically altering the interlocking relations to give the valve different positions for the same given setting of the responsive means as a different function of the movement of the responsive means when the conditions require to substantially maintain the conditions constant.

21. An automatic temperature control system comprising a pyrometer in operative association with a furnace, a fuel valve, an interlocking combination operatively associating the pyrometer and valve in predetermined driving relation to establish temporarily the relative positions of the pyrometer and valve at which the furnace conditions affecting the pyrometer are satisfactory as a function of the positioning of the pyrometer, and means in the combination for changing the relative positions of the pyrometer and valve to establish a new position relative to which furnace conditions are satisfactory after an interruption in the first mentioned satisfactory conditions as a different function of the position of the pyrometer.

22. The method of automatically controlling a condition substantially at a given value which comprises varying the condition controlling means a degree a predetermined function of the deviation of the condition from the given value, the function being automatically variable in accordance with the degree of deviation of the condition from the given value, and in retaining a substantial portion of the variation in the condition controlling means following subsequent opposite variation of the condition controlling means when the said deviation of the condition is checked and the condition returns to the given value, and in varying said retained portion in accordance with the variation in magnitude of said deviation.

23. A regulator controlling system comprising means arranged to manifest a condition, a condition responsive means, a regulating means for controlling the condition, an electric system operatively associated with the regulating means and with the responsive means and arranged to actuate the regulator as a function of the deviation of the responsive means within a primary predetermined range to modify the condition to urge it to remain such that the responsive means remains within the primary range, means responsive to deviation of the condition responsive means beyond the limits of the primary range to modify the electrical system so that the regulating means is actuated as a different function of the deviation within a wider secondary predetermined range to secure a greater variation of the regulator to check the trend of the condition, the whole so constructed and arranged as to retain a substantial portion of the variation in the regulating means when the deviation of the condition in the secondary range is checked and the condition returns to the primary range, and so arranged that the retained portion of the variation varies as a function of the amplitude of the deviation in the secondary range.

CHRISTIAN WILHJELM.